(12) United States Patent
Huang et al.

(10) Patent No.: US 11,313,712 B2
(45) Date of Patent: Apr. 26, 2022

(54) METHOD OF DETERMINING WHETHER THERE IS A TEST SAMPLE SUPPLY

(71) Applicant: SHIMADZU CORPORATION, Kyoto (JP)

(72) Inventors: Hongyi Huang, Shanghai (CN); Chao Xu, Shanghai (CN); Ting Gu, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 233 days.

(21) Appl. No.: 16/367,591

(22) Filed: Mar. 28, 2019

(65) Prior Publication Data
US 2019/0301918 A1 Oct. 3, 2019

(30) Foreign Application Priority Data
Mar. 29, 2018 (CN) .......................... 201810271874.9

(51) Int. Cl.
| | |
|---|---|
| *G01F 23/292* | (2006.01) |
| *G01N 21/75* | (2006.01) |
| *G01N 1/10* | (2006.01) |
| *G01N 21/77* | (2006.01) |

(52) U.S. Cl.
CPC .......... *G01F 23/2921* (2013.01); *G01N 1/10* (2013.01); *G01N 21/77* (2013.01); *G01N 2021/754* (2013.01); *G01N 2021/755* (2013.01)

(58) Field of Classification Search
CPC ..................... G01N 2021/754; G01F 23/2921
See application file for complete search history.

(56) References Cited

U.S. PATENT DOCUMENTS

| | | | | |
|---|---|---|---|---|
| 2006/0154327 | A1* | 7/2006 | Bachur, Jr. ............. | C12M 41/40 435/34 |
| 2017/0285054 | A1* | 10/2017 | Muz ................. | G01N 35/00623 |

* cited by examiner

*Primary Examiner* — Paul M. West
(74) *Attorney, Agent, or Firm* — Sughrue Mion, PLLC

(57) ABSTRACT

A method for determining whether a testing specimen is supplied to a testing system, which includes a reaction tank in which the testing specimen reacts; a light source for emitting testing light into the reaction tank from one side of the reaction tank; and a photoelectric sensor that is placed on the side of the reaction tank opposite to the light source for receiving the testing light traveled through the reaction tank and that converts the received testing light into an electrical signal. The amount of the testing specimen to be added into the reaction tank is set so that the level of the testing specimen is above the light path of the testing light while the reaction tank is cleaned. Whether the testing specimen is supplied is determined based on the presence of change of the electrical signal output from the photoelectric sensor.

8 Claims, 1 Drawing Sheet

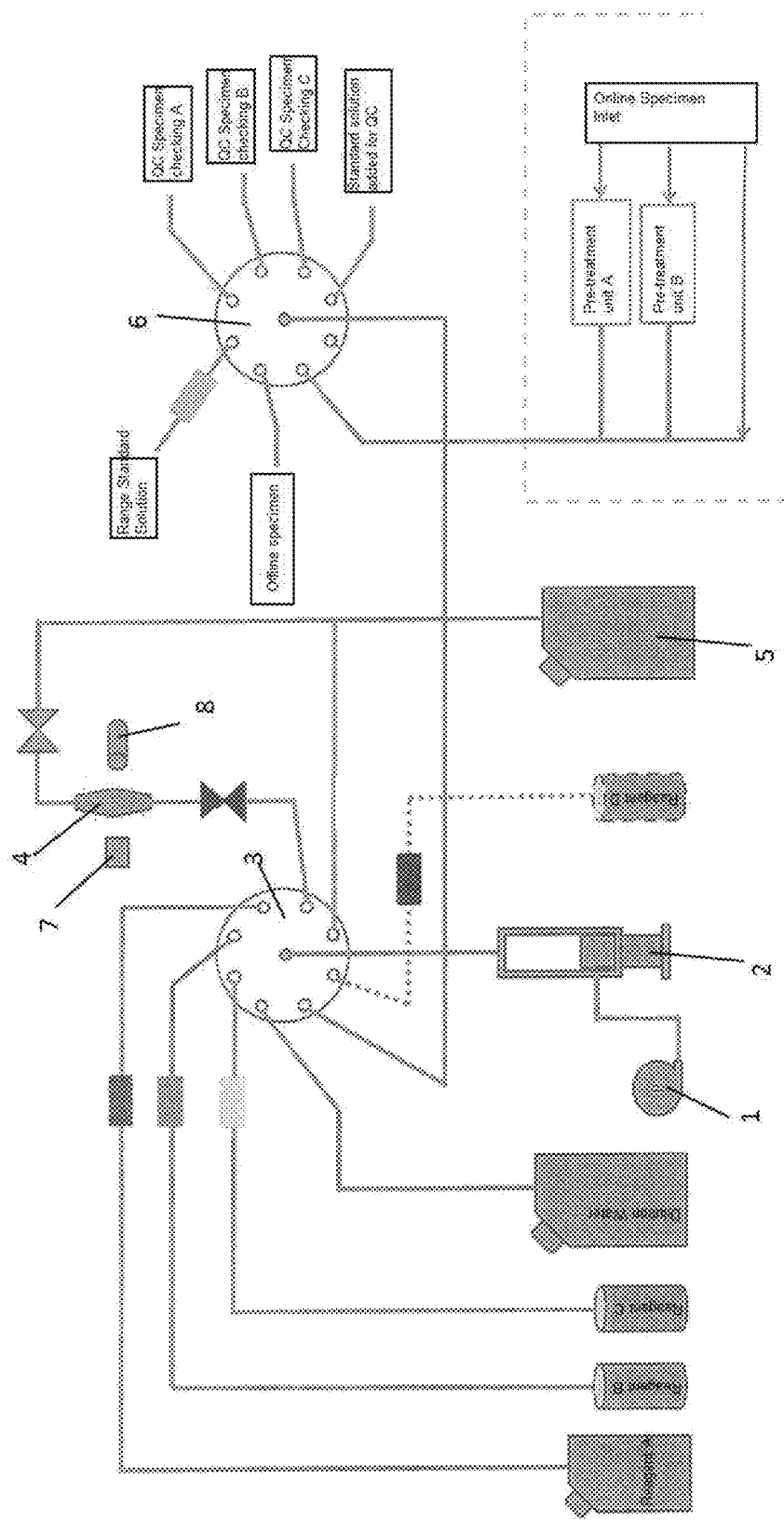

METHOD OF DETERMINING WHETHER THERE IS A TEST SAMPLE SUPPLY

FIELD

This application claims priority from Chinese Patent Application No. 201810271874.9 filed on Mar. 29, 2018, the entire contents of which are herein incorporated by reference.

The present invention relates to a method for determining whether a testing specimen is supplied.

DESCRIPTION OF RELATED ART

In a testing system, determining whether a testing specimen is supplied is needed to avoid testing errors resulted from causes such as false testing or to avoid wasting of resources. In addition, for a testing system for real time online testing of a testing specimen, such as the one used in real time environmental monitoring, determining whether the online specimen is collected is needed to know in time whether the collecting system is in fault condition.

The testing system mainly comprises a reaction tank, a specimen inlet part, a reagent supplying part, and a spectrophotometer (including a light source and a photoelectric sensor). The reaction tank is used for the reaction between the specimen and the reagent. The testing results such as ions contained in the specimen are obtained by testing the specimen after the reaction.

At present, there are two determining methods for determining whether a testing specimen is supplied into the testing system. The first uses a level sensor for determining whether a testing specimen is supplied. The second uses a spectrophotometer included in the testing system for determining whether a testing specimen is supplied after a reagent and a specimen are mixed and the judgment is made either before reaction or after complete reaction. Specifically, judgment on whether a testing specimen needs dilution should be made firstly. Then, different determining methods are used based on whether dilution is needed.

When a testing specimen does not need dilution, or is of low concentration, larger amount of the testing specimen is supplied. Without supplying the testing specimen, even a reagent is added, the level would still be below the position of the spectrophotometer, which would indicate a light intensity just about the same of that for air. That is, although the testing system is instructed to supply the testing specimen, the spectrophotometer does not detect any change of the light intensity and it is therefore determined that no testing specimen is supplied. On the other hand, when a testing specimen is supplied, the level would be above the position of the spectrophotometer (that is, above the light path of the testing light) after the testing specimen is mixed with the reagent. In such cases, the spectrophotometer would detect change of the light intensity and it is therefore determined that a testing specimen is supplied.

When a testing specimen needs dilution, or is of high concentration, as dilution solution needs to be added, even the level after the reagent is added is above the position of the spectrophotometer, it could not be determined whether the testing specimen is supplied. Therefore, it is only possible to determine whether the testing specimen is supplied after the reaction ends with the help of the color and light intensity.

SUMMARY OF THE INVENTION

The Problems to be Solved by the Invention

With regard to the abovementioned two methods currently existing, the first one needs a level sensor as well as redesign of related hardware and software in the testing system. The second one needs different methods for determining based on whether dilution is needed and therefore the logic of the firmware is complex. In addition, as reagents are needed, the method not only causes waste of the reagents, but also may incorrectly determine when the reagents are not supplied. Furthermore, when dilution is needed, judgment could only be made after the reaction ends. It may cause waste of resources when a testing specimen is not supplied.

The present invention is designed to aim at the abovementioned technical problems with the objective of providing a simple and reliable method for determining whether a testing specimen is supplied with existing apparatuses in a testing system.

Technical Solutions to the Problems

The method for determining whether a testing specimen is supplied related to the present invention is a method for determining whether a testing specimen is supplied to a testing system, and the testing system includes: a reaction tank in which the testing specimen reacts; a light source for emitting testing light into the reaction tank from one side of the reaction tank; and a photoelectric sensor that is placed on the side of the reaction tank opposite to the light source for receiving the testing light traveled through the reaction tank and that converts the received testing light into an electrical signal, and the determining method is characterized by including determining step, by which the amount of the testing specimen to be added into the reaction tank is set so that the level of the testing specimen is above the light path of the testing light and whether a testing specimen is supplied is determined based on the presence or absence of change of the electrical signal output from the photoelectric sensor.

Effects of the Present Invention

In the existing second method, as determining whether a testing specimen is supplied is made either before reaction or after complete reaction after a reagent and a specimen are mixed, the amount of testing specimen to be supplied must be specified beforehand according to factors such as the volume of the reaction tank or the needed proportion of the testing specimen and the reagent in a reaction and could not be changed at will.

On the other hand, in testing of a testing specimen, pipes and reaction tank etc. need to be cleaned with the testing specimen before the testing in order to remove the effects of the residue in the pipes and the reaction tank on the testing results and the amount of the testing specimen to be added for cleaning can be set at will. In addition, in special procedures for monitoring whether an online specimen is supplied normally, or in procedures for testing a testing specimen where the amount of the testing specimen to be added into the reaction tank can be changed at will, it is possible to set the amount of the testing specimen to be added at will. Therefore, by changing the amount of a testing specimen to be added in procedures such as those mentioned above, particularly by changing the amount of a testing specimen to be added in cleaning procedures, the present invention can set the amount so that the level of the testing specimen to be added into a reaction tank is above the position of a spectrophotometer (that is, above the light path of the testing light), and whether a testing specimen is supplied can be determined simply and reliably with existing apparatuses in a testing system.

BRIEF DESCRIPTION OF THE DRAWINGS

The FIGURE shows one example of the testing system that employs the determining method described by the present invention.

DETAILED DESCRIPTION

Below is a detailed description of the present invention with reference to the drawings.

As shown in the FIGURE, the testing system in the present invention has the air agitator 1, the injector 2, the 8-way valve 3 and 6, the reaction tank 4, the effluent bucket 5, the photoelectric sensor 7, the light source 8, and the containers for reagent A-D and the dilution water. The photoelectric sensor 7 and light source 8 are apparatuses in existing spectrophotometer. The photoelectric sensor 7 receives the testing light from the light source 8 and traveled through the reaction tank 4. In addition, as shown in the FIGURE, with the shifting of the 8-way valve 6, the testing system in the present invention can not only test an offline specimen, but also test the online specimen collected in real time. The description below relates to testing of an online specimen. However, the determining method of the present invention can also be applied to testing of an offline specimen. In addition, the application of the determining method of the present invention is not limited to testing of offline and online specimens. The method can also be used in determining whether specimens are supplied normally in cases such as correction of a testing system and the testing of specimens for quality control.

For testing of an online specimen, the collecting system not shown in the FIGURE is used for collecting in real time the online specimen of the objects to be monitored in real time. The online specimen is then enters into the testing system through the online specimen inlet. Before injecting the online specimen into the reaction tank through air agitator 1 and injector 2, pre-treatment unit A or B can be used for pre-treating the online specimen, which however could also be injected into the reaction tank without pre-treatment.

Then, the online specimen is used for cleaning the pipes, the injector 2, the 8-way valve 3 and 6, and the reaction tank 4 and then is discharged into the effluent bucket 5. After the cleaning, pre-specified amount of online specimen and reagent is injected into the reaction tank 4, wherein the online specimen would react with the reagent. When the reaction is completed, the liquid obtained after the reaction is tested to obtain testing results about ions and others contained in the online specimen. After the testing, the air agitator 1 and injector 2 are used for discharging the liquid obtained after the reaction into the effluent bucket 5.

For such a testing system, whether an online specimen is supplied needs to be determined.

In the present invention, the photoelectric sensor 7 and light source 8 of the existing spectrophotometer in a testing system is used for determining whether an online specimen is supplied. Specifically, as in the process of cleaning the reaction tank 4, the amount of online specimen to be added into the reaction tank 4 can be changed at will, therefore, it is possible to set the amount of the online specimen to be added into the reaction tank so that the level of the testing specimen is above the light path and whether an online specimen is supplied is determined based on the presence or absence of change of the electrical signal output from the photoelectric sensor 7. In addition, based on the presence of change of the electrical signal output from the photoelectric sensor 7, it is determined that an online specimen is supplied.

Therefore, the determining method of the present invention has the following procedures: the cleaning procedure in which an online specimen is used for cleaning the pipes and the reaction tank 4 etc. of the testing system before testing of the online specimen (the testing includes adding reagents to be reacted with the online specimen); and the determining procedure, in which in the process of cleaning the reaction tank 4, the amount of online specimen to be added into the reaction tank 4 is set so that the level of the testing specimen is above the light path and whether the online specimen is supplied is determined based on the presence or absence of change of the electrical signal output from the photoelectric sensor 7.

As shown in the above discussion, the determining method of the present invention is used when the reaction tank is cleaned with an online specimen, which does not need to be complemented with reagents and the concentration of which does not need to be considered. Therefore, it is possible to judge simply and reliably on whether an online specimen is supplied with the existing apparatuses in a testing system.

In addition, in the absence of change of the electrical signal output from the photoelectric sensor 7, although it can be determined that an online specimen is not supplied, considering the effects of something such as impurities in the online specimen on the testing light, the change of the testing light received by the photoelectric sensor 7 may be smaller than the one that can be sensed by the photoelectric sensor 7 when the online specimen is added into the reaction tank 4. In such cases, the initial judgment that the online specimen is not supplied may be a misjudgment. With regard to this problem, in the present invention, in cases there is no change of the electrical signal output from photoelectric sensor 7 that converts the light intensity information of the testing light into the electrical signal or the change is subtle, the power of the light source 8 is increased to increase the intensity of the testing light so that photoelectric sensor 7 can sense the change in light intensity of the testing light before and after the online specimen is added. Then, the question of whether the electrical signal output from the photoelectric sensor 7 changes will be determined again. In the absence of change of the electrical signal output from the photoelectric sensor 7 even the power of the light source 8 reaches to its maximum level, it is determined that the online specimen is not supplied. The misjudgment therefore can be further avoided and the reliability of the determining method of the present invention can be improved further.

In addition, when it is determined that an online specimen is not supplied, it can be further determined that the collecting system for real time collecting is in fault condition and a person should be assigned with the task of examining and fixing the issue as soon as possible.

Also, although the discussion above described the cleaning of the reaction tank 4 etc. for testing of an online specimen and thus determining whether the online specimen is supplied in the cleaning procedure, the present invention should not be limited by such discussion as it is also possible to use the method for determining in a special procedure wherein normal supply of an online specimen is monitored or in other procedures wherein it is possible to add online specimen so that the level is above the light path of the testing light in a measurement procedure. In the present invention, for procedures wherein the amount of an online specimen can be added to a level that is above the light path of the testing light, all that is needed is to determine whether the online specimen is supplied.

The above detailed description of the present invention is for illustrative purposes and is not intended to limit the scope the present invention. Various embodiments can be realized for the present invention within its main ideas through various omissions, replacements, alterations, and combinations. The detailed description of the present invention and its variations are included in the scope and main ideas of the present invention as well as in the scope of the invention documented in the claims and of its equivalents.

LEGEND

1. Air agitator,
2. Injector,
3. 8-way valve,
4. Reaction tank,
5. Effluent bucket,
6. 8-way valve,
7. Photoelectric sensor,
8. Light source.

What is claimed is:

1. A testing method using a testing system, the testing system including a reaction tank in which a testing specimen is to react to reagents; a light source for emitting testing light into the reaction tank from one side of the reaction tank; and a photoelectric sensor that is placed on the side of the reaction tank opposite to the light source for receiving the testing light traveled through the reaction tank and that converts the received testing light into an electrical signal, the method comprising:
   cleaning pipes and the reaction tank of the testing system using the testing specimen by adding the testing specimen without the reagents into the reaction tank so that a level of the testing specimen is above a light path of the testing light;
   determining whether the testing specimen is supplied based on the presence or absence of change of the electrical signal output from the photoelectric sensor;
   discharging the testing specimen from the reaction tank;
   after discharging the testing specimen, adding the testing specimen with the reagents into the reaction tank; and
   testing the testing specimen added to the reaction tank with the reagents.

2. The method according to claim 1, wherein it is determined that the testing specimen is supplied based on the presence of a change of the electrical signal output from the photoelectric sensor.

3. The method according to claim 2, wherein
an online specimen collected in real time by a collecting system is used as the testing specimen when the testing system is used for real time online testing,
and in the determining step, when it is determined that the testing specimen is not supplied, it is also determined that the collecting system is in fault condition.

4. The method according to claim 1, wherein
the photoelectric sensor is used for converting a light intensity of the testing light into an electrical signal.

5. The method according to claim 4, wherein
an online specimen collected in real time by a collecting system is used as the testing specimen when the testing system is used for real time online testing,
and in the determining step, when it is determined that the testing specimen is not supplied, it is also determined that the collecting system is in fault condition.

6. The method according to claim 1, wherein
an online specimen collected in real time by a collecting system is used as the testing specimen when the testing system is used for real time online testing,
and in the determining step, when it is determined that the testing specimen is not supplied, it is also determined that the collecting system is in fault condition.

7. A method for determining whether a testing specimen is supplied to a testing system, including a reaction tank in which the testing specimen reacts; a light source for emitting testing light into the reaction tank from one side of the reaction tank; and a photoelectric sensor that is placed on the side of the reaction tank opposite to the light source for receiving the testing light traveled through the reaction tank and that converts the received testing light into an electrical signal,
the method comprising:
   setting an amount of the testing specimen to be added into the reaction tank so that a level of the testing specimen is above a light path of the testing light;
   determining whether the testing specimen is supplied based on the presence or absence of change of the electrical signal output from the photoelectric sensor; and
   increasing an intensity of the testing light emitted from the light source in cases where the electrical signal from the photoelectric sensor barely changes or does not change, and then determining whether the testing specimen is supplied based on the presence or absence of change of the electrical signal output from the photoelectric sensor.

8. The method according to claim 7, wherein
an online specimen collected in real time by a collecting system is used as the testing specimen when the testing system is used for real time online testing,
and in the determining step, when it is determined that the testing specimen is not supplied, it is also determined that the collecting system is in fault condition.

* * * * *